US011489737B2

(12) United States Patent
Xu et al.

(10) Patent No.: US 11,489,737 B2
(45) Date of Patent: *Nov. 1, 2022

(54) NETWORK PERFORMANCE ASSURANCE METHOD AND APPARATUS

(71) Applicant: HUAWEI TECHNOLOGIES CO., LTD., Guangdong (CN)

(72) Inventors: Ruiyue Xu, Shanghai (CN); Kai Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/337,865

(22) Filed: Jun. 3, 2021

(65) Prior Publication Data

US 2021/0297326 A1    Sep. 23, 2021

Related U.S. Application Data

(63) Continuation of application No. 16/876,412, filed on May 18, 2020, now Pat. No. 11,050,638, which is a (Continued)

(30) Foreign Application Priority Data

Nov. 22, 2017  (CN) .......................... 20171117449.X
Aug. 29, 2018  (WO) ................ PCT/CN2018/103094

(51) Int. Cl.
*G06F 15/173* (2006.01)
*H04L 41/5019* (2022.01)
(Continued)

(52) U.S. Cl.
CPC ...... *H04L 41/5019* (2013.01); *H04L 41/0813* (2013.01); *H04L 41/0846* (2013.01)

(58) Field of Classification Search
CPC ............ H04L 41/5019; H04L 41/0813; H04L 41/0846
(Continued)

(56) References Cited

U.S. PATENT DOCUMENTS

2008/0095057 A1    4/2008  Zhou
2012/0330711 A1   12/2012  Jain et al.
(Continued)

FOREIGN PATENT DOCUMENTS

CN         1794866 A      6/2006
CN       101662413 A      3/2010
(Continued)

OTHER PUBLICATIONS

RAN WG3 Meeting #92, R3-161135: "RAN configuration of network slices", Huawei, Nanjing, China, May 23-27, 2016 (5 pages).
(Continued)

*Primary Examiner* — Duyen M Doan
(74) *Attorney, Agent, or Firm* — Leydig, Voit & Mayer, Ltd.

(57) ABSTRACT

Embodiments of this application provide a network performance assurance method and apparatus. When the network performance assurance method is applied, a second management device determines network performance assurance information. The network performance assurance information includes at least one of a network performance assurance granularity and a network performance assurance condition. The second management device sends a target network management request including the network performance assurance information to a first management device. The first management device receives the target network management request sent by the second management device, and manages a target network based on the at least one of the network performance assurance granularity and the network performance assurance (Continued)

performance assurance condition included in the target network management request.

20 Claims, 7 Drawing Sheets

Related U.S. Application Data continuation of application No. PCT/CN2018/113497, filed on Nov. 1, 2018.

(51) Int. Cl.
  *H04L 41/0813* (2022.01)
  *H04L 41/084* (2022.01)
(58) Field of Classification Search
  USPC .................................................. 709/223–225
  See application file for complete search history.

(56) References Cited

U.S. PATENT DOCUMENTS

| | | | | |
|---|---|---|---|---|
| 2017/0070892 | A1* | 3/2017 | Song | H04L 41/0896 |
| 2018/0332441 | A1* | 11/2018 | Shaw | H04L 63/105 |
| 2019/0124544 | A1* | 4/2019 | Shaw | H04W 28/0268 |
| 2019/0327153 | A1* | 10/2019 | Wahlqvist | H04W 24/02 |
| 2020/0059521 | A1 | 2/2020 | Sciancalepore et al. | |
| 2020/0068074 | A1 | 2/2020 | Cai et al. | |
| 2020/0275356 | A1* | 8/2020 | Forsman | H04L 41/0895 |

FOREIGN PATENT DOCUMENTS

| | | |
|---|---|---|
| CN | 102098727 A | 6/2011 |
| CN | 103607347 A | 2/2014 |
| CN | 103649920 A | 3/2014 |
| CN | 103763130 A | 4/2014 |
| CN | 103782556 A | 5/2014 |
| CN | 104869021 A | 8/2015 |
| CN | 105451249 A | 3/2016 |
| CN | 106549806 A | 3/2017 |
| CN | 106713406 A | 5/2017 |
| EP | 1039661 A1 | 9/2000 |
| EP | 1250022 A1 | 10/2002 |
| EP | 3024184 A1 | 5/2016 |
| WO | 2017140356 A1 | 8/2017 |

OTHER PUBLICATIONS

Office Action dated Sep. 11, 2019, issued in counterpart CN Application No. 201711174449.X, with English translation (20 pages).
International Search Report dated Jan. 16, 2019, issued in counterpart PCT Application No. PCT/CN2018/113497, with English translation (12 pages).
Extended (Supplementary) European Search Report dated Nov. 27, 2020, issued in counterpart EP Application No. 18880817.4 (9 pages).

* cited by examiner

NETWORK PERFORMANCE ASSURANCE METHOD AND APPARATUS

CROSS-REFERENCE TO RELATED APPLICATIONS

This application is a continuation application of U.S. application Ser. No. 16/876,412, filed on May 18, 2020, which is a continuation of International Application No. PCT/CN2018/113497, filed on Nov. 1, 2018, which claims priority to Chinese Patent Application No. 201711174449.X, filed on Nov. 22, 2017 and which claims priority to International Patent Application No. PCT/CN2018/103094, filed on Aug. 29, 2018. The disclosures of the aforementioned applications are hereby incorporated by reference in their entireties.

TECHNICAL FIELD

This application relates to the field of communications technologies, and in particular, to a network performance assurance method and apparatus.

BACKGROUND

With development of communications technologies, there are increasingly diversified communications services, and different communications services have significantly different requirements for network performance such as mobility, security, capacity, latency, and reliability.

In a next-generation communications system, for example, in a fifth-generation (5G) mobile communications system, a network slice (NS) concept is introduced to cope with a problem that different communications services have different network performance requirements.

When a 5G network slicing technology is used, network resources of each slice need to be managed to ensure that performance of a bearer service is assured, for example, a service level agreement (SLA) indicator requirement is met. Currently, an operator usually negotiates an SLA indicator with an equipment vendor in advance. When an SLA indicator is obtained through negotiation, the operator manages network resources based on the negotiated SLA indicator by using the unified SLA indicator, and performs network performance assurance for terminals in an entire network, so that network performance can be assured for all the terminals in the entire network. However, in such a manner of using a unified SLA indicator to perform network performance assurance for terminals in an entire network, a very high requirement is imposed on performance of a management device that manages network resources in the operator, and it is very difficult to assure performance of all the terminals in the entire network. This increases an evaluation failure probability during network performance evaluation.

SUMMARY

Embodiments of this application provide a network performance assurance method and apparatus. The method and apparatus may lower a requirement on performance of a management device that manages a network resource, and increase a network performance evaluation pass probability.

According to a first aspect, a network performance assurance method is provided. In the method, a second management device determines network performance assurance information, where the network performance assurance information includes at least one of a network performance assurance granularity and a network performance assurance condition, the network performance assurance granularity is used to describe a network performance assurance object of a target network, and the network performance assurance condition is used to describe a probability that a network performance assurance object meets network performance; the second management device sends a target network management request including the network performance assurance information to a first management device; and the first management device receives the target network management request sent by the second management device, and manages the target network based on the at least one of the network performance assurance granularity and the network performance assurance condition included in the target network management request.

The first management device may be understood as a device that manages a target network, and the second management device may be understood as a device that determines network performance assurance information and sends a network management request. The first management device may be a domain management (DM), and the second management device may be a network management (NM); or the first management device may be an NM, and the second management device may be a service management function (SMF); or the first management device may be a DM and an NM, and the second management device may be an SMF. Specifically, the first management device may adjust the target network based on network performance assurance information, so that an adjusted target network can meet the network performance assurance information.

According to the network performance assurance method provided in this embodiment of this application, the network performance assurance information includes the at least one of the network performance assurance granularity and the network performance assurance condition. Therefore, it may not be necessary to assure performance of terminals in the entire network, provided that the network performance of the target network meets the network performance assurance granularity and/or the network performance assurance condition included in the network performance assurance information. This can lower a network device performance requirement, increase a network performance evaluation pass rate, and reduce an exception processing probability.

The network performance assurance granularity is used to describe the network performance assurance object, and the network performance assurance object may be at least one of a single terminal, a cell, a region, a terminal group (UE Group), and a tenant.

The network performance assurance condition is used to describe the probability that a network performance assurance object meets network performance. For example, the probability that a network performance assurance object meets network performance includes at least one of the following proportions: a proportion of network performance assurance objects that meet the network performance in all network performance assurance objects, and a proportion of a usage time in which network performance is met in a service usage process of the network performance assurance object in a total time. Optionally, the network performance assurance condition may be alternatively used to describe a probability that a network performance assurance object does not meet network performance, for example, a proportion of network performance assurance objects that do not meet the network performance in all network performance assurance objects, or a proportion of a usage time in which service performance is not met in a service usage process of the network performance assurance object in a total time. For example, a probability that a service performance assurance object meets service performance is a proportion of service performance assurance objects that do not meet the service performance in all service performance assurance objects. When the proportion is set to 20%, it indicates that at least 20% of terminals using a service in the target network do not meet a requirement that a user rate is greater than or equal to 20 Mbps. In a service usage process of a service performance assurance object, a probability that a service performance assurance object does not meet service performance is a proportion of a usage time in which the service performance is not met in a total time. When the proportion is set to 20%, it indicates that a requirement that a guaranteed bit rate is greater than or equal to 80% is not met in at least 20% of a time in a process of using a service by each terminal using a service in the target network.

In a possible design, the network performance assurance information may further include an applicable condition corresponding to the network performance assurance information. The applicable condition may be a specified condition for using service performance assurance information. For example, the service performance assurance information includes a service performance assurance granularity, a service performance assurance condition, and an applicable condition of the service performance assurance granularity and the service performance assurance condition. Alternatively, the applicable condition may be a user group using service performance assurance information. For example, the service performance assurance information includes a service performance assurance granularity and an applicable condition of the service performance assurance granularity.

In another possible design, the second management device may determine the network performance assurance information in the following manner: The second management device receives a service request, where the service request includes service performance assurance information, and the service performance assurance information includes at least one of a service performance assurance granularity and a service performance assurance condition. The service performance assurance information may further include an applicable condition corresponding to the service performance assurance information, in other words, an applicable condition of the at least one of the service performance assurance granularity and the service performance assurance condition. The second management device determines the network performance assurance information based on the service performance assurance information included in the service request.

In another possible design, the first management device may send at least one piece of network performance assurance capability information supported by the target network to the second management device, where the at least one piece of network performance assurance capability information supported by the target network may include the network performance assurance information of the target network, for example, may include the at least one of the network performance assurance granularity supported by the target network and the network performance assurance condition supported by the target network. The second management device receives the at least one piece of network performance assurance capability information supported by the target network that is sent by the first management device, and determines the network performance assurance information based on the at least one piece of network performance assurance capability information supported by the target network, so that the network performance assurance information determined by the second management device can be supported by the target network.

In another possible design, before sending the at least one piece of network performance assurance capability information supported by the target network to the second management device, the first management device may obtain a network template corresponding to the target network. The network template corresponding to the target network is used to deploy a network component in the target network, and may also be referred to as a network component template. The network template includes the at least one piece of network performance assurance capability information supported by the target network. After obtaining the network template corresponding to the target network, the first management device may determine, based on the at least one piece of network performance assurance capability information included in the network template, the network performance assurance capability information supported by the target network.

In another possible design, the first management device may manage the target network based on the network performance assurance information in the following manner: The first management device may select or create a network that meets the network performance assurance information included in the target network management request, to serve as the target network. For example, when the network performance assurance information includes the network performance assurance granularity, the first management device may select or create a network in which network performance assurance is performed based on the network performance assurance granularity included in the target network management request, to serve as the target network. If the network performance assurance information includes the network performance assurance condition, the first management device may select or create a network that meets the network performance assurance condition included in the target network management request, to serve as the target network. If the network performance assurance information includes the network performance assurance condition and the network performance assurance granularity, the first management device may select or create a network in which network performance assurance is performed based on the network performance assurance granularity and that meets the network performance assurance condition, to serve as the target network. If the network performance assurance information further includes the applicable condition corresponding to the network performance assurance information, the first management device may select the network performance assurance information based on the applicable condition to perform network performance assurance.

In a possible example, after selecting or creating the network that meets the network performance assurance information, to serve as the target network, the first management device may further determine whether the selected or created network meets the network performance assurance information in the target network management request in a running process. If the first management device determines that the selected or created network does not meet the network performance assurance information in the running process, the first management device performs exception processing. When performing exception processing, the first management device may adjust the selected or created network, so that an adjusted network meets the network performance assurance information. In this embodiment of this application, the first management device may adjust the selected or created network in at least one of the following manners: modifying a topology structure of the selected or created network; adjusting a transport network between network components in the selected or created network; replacing a network component in the selected or created network with a new network component; and upgrading a network component in the selected or created network. When performing exception processing, the first management device may alternatively send a network performance assurance exception notification to the second management device, to notify the second management device that the current target network cannot meet the network performance assurance information in the target network management request.

In another possible design, the first management device may manage the target network based on the network performance assurance information in the following manner: The first management device may configure the network performance assurance information in the target network or in management information of the target network, so that the target network meets the configured network performance assurance information. Configuring the network performance assurance information in the target network may be understood as follows: The first management device stores the network performance assurance information in the target network or sends the network performance assurance information to the target network. Configuring the network performance assurance information in the management information of the target network may be understood as follows: The first management device stores the network performance assurance information in the management information of the target network. If the network performance assurance information includes the network performance assurance granularity, the first management device may configure the network performance assurance granularity in the target network or in the management information of the target network. If the network performance assurance information includes the network performance assurance condition, the first management device may configure the network performance assurance condition in the target network or in the management information of the target network.

In a possible example, after the first management device configures the network performance assurance information in the target network or in the management information of the target network, the first management device may determine whether the target network in which the network performance assurance information is configured meets the network performance assurance information in the target network management request in a running process. If the first management device determines that the target network in which the network performance assurance information is configured does not meet the network performance assurance information in the target network management request in the running process, the first management device performs exception processing on the target network. When performing exception processing, the first management device may adjust the target network, so that an adjusted target network meets the network performance assurance information. In this embodiment of this application, the first management device may adjust the target network in at least one of the following manners: modifying a topology structure of the target network; adjusting a transport network between network components in the target network; replacing a network component in the target network with a new network component; upgrading a network component in the target network; and configuring a network component in the network. The configuring a network component in the network may include: when the network component in the network is a base station or a wireless network including a base station, configuring an antenna of the base station, configuring an optimization policy (including a handover policy and the like) of the base station, adding a resource, or the like. When performing exception processing, the first management device may alternatively send a network performance assurance exception notification to the second management device, to notify the second management device that the current target network cannot meet the network performance assurance information in the target network management request.

According to a second aspect, a network performance assurance apparatus is provided. The network performance assurance apparatus may be applied to a first management device, and the network performance assurance apparatus applied to the first management device has functions of implementing the method performed by the first management device in the first aspect. The functions may be implemented by hardware, or may be implemented by hardware executing corresponding software. The hardware or the software includes at least one module corresponding to the foregoing functions.

In a possible design, the network performance assurance apparatus applied to the first management device includes a receiving unit and a processing unit, and may further include a sending unit. Functions of the receiving unit, the processing unit, and the sending unit may correspond to method steps. Details are not described herein again.

In another possible design, the network performance assurance apparatus applied to the first management device may include an input interface, an output interface, a processor, and a memory. The input interface, the output interface, the processor, and the memory may be connected to each other by using a bus system. The memory is configured to store a program, and the processor is configured to execute the program in the memory, to perform the method performed by the first management device in the first aspect or any possible design of the first aspect.

According to a third aspect, a network performance assurance apparatus is provided. The network performance assurance apparatus may be applied to a second management device, and the network performance assurance apparatus applied to the second management device has functions of implementing the method performed by the second management device in the first aspect. The functions may be implemented by hardware, or may be implemented by hardware executing corresponding software. The hardware or the software includes at least one module corresponding to the foregoing functions.

In a possible design, the network performance assurance apparatus applied to the second management device includes a processing unit and a sending unit, and may further include a receiving unit. Functions of the processing unit, the sending unit, and the receiving unit may correspond to method steps. Details are not described herein again.

In another possible design, the network performance assurance apparatus applied to the second management device may include an input interface, an output interface, a processor, and a memory. The input interface, the output interface, the processor, and the memory may be connected to each other by using a bus system. The memory is configured to store a program, and the processor is configured to execute the program in the memory, to perform the method performed by the second management device in the first aspect or any possible design of the first aspect.

According to a fourth aspect, an embodiment of this application provides a communications system. The communications system includes the network performance assurance apparatus applied to the first management device in the second aspect and the network performance assurance apparatus applied to the second management device in the third aspect.

According to a fifth aspect, an embodiment of this application provides a computer readable storage medium. The computer readable storage medium stores a computer instruction, and when the instruction is run on a computer, any method performed by the first management device or the second management device in the first aspect or any possible design of the first aspect can be completed.

According to a sixth aspect, a computer program product is provided. The computer program product includes a computer program, and the computer program is used to perform any method performed by the first management device or the second management device in the first aspect and any possible design of the first aspect.

According to a seventh aspect, a chip is provided. The chip is coupled to a transceiver in a first management device or a second management device, and is configured to perform the technical solution in any possible design provided in the first aspect of the embodiments of this application. It should be understood that "coupling" in the embodiments of this application means that two components are directly or indirectly combined with each other. Such a combination may be fixed or mobile, and the combination may allow fluid, electricity, electrical signals, or other types of signals to communicate between the two components.

According to the network performance assurance method and apparatus provided in the embodiments of this application, the network performance assurance information includes the at least one of the network performance assurance granularity and the network performance assurance condition. Therefore, it may not be necessary to assure performance of terminals in the entire network provided that the network performance of the target network meets the network performance assurance granularity and/or the network performance assurance condition included in the network performance assurance information. This can lower a network device performance requirement, increase a network performance evaluation pass rate, and reduce an exception processing probability.

DESCRIPTION OF EMBODIMENTS

The following describes the embodiments of this application with reference to accompanying drawings.

Figure 1:
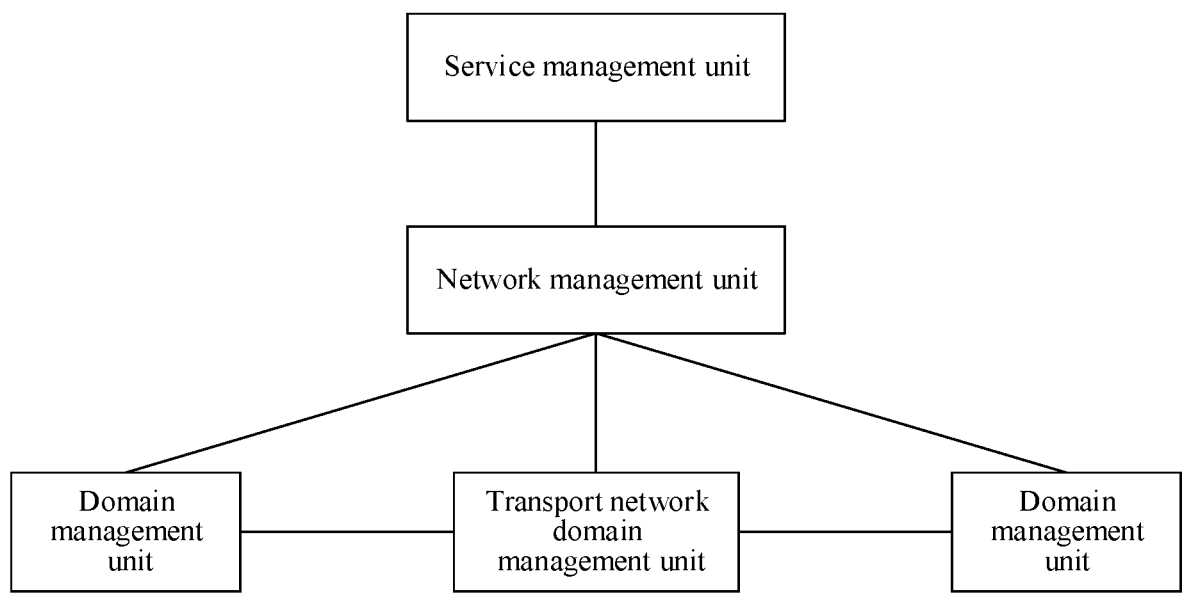
FIG. 1 is a diagram of a system architecture to which a network performance assurance method is applied according to an embodiment of this application.

FIG. 1 is a diagram of a system architecture to which a network performance assurance method is applied according to an embodiment of this application. The system architecture shown in FIG. 1 mainly includes the following network elements: a service management function (SMF) unit, a network management (NM) unit, a domain management (DM) unit, and a transport network manager (TN Manager). The SMF may be understood as a customer, and is mainly configured to: receive a service requirement of a related tenant; convert the service requirement into a network slice-related requirement; and perform service-related management. It should be noted that a name of the SMF is not limited in the embodiments of this application. For example, the SMF may also be referred to as a customer service management function or a communication service management function (CSMF). The SMF may be an independent management unit, or may be a specific function in any management unit, for example, may be a specific function in a business support system (BSS), a service management unit, a service orchestration unit, or a service management and orchestration unit. It should be further noted that the SMF may be included or may not be included in an operations support system (OSS). In addition, the SMF in the embodiments of this application may alternatively be a management unit or an operation unit of a user.

The NM may also be understood as a network slice management function (NSMF). A main function of the NM includes an end-to-end network management function, or an end-to-end network orchestration function, or both. Specifically, the NM may have some or all of the following functions:

The NM can perform end-to-end network management (for example, network life cycle management, network template management, network fault management, network performance management, and network configuration management) and mapping among an end-to-end network, a subnet, and a network function; coordinate sub-SLAs or network resources provided by different domains (for example, an access network domain, a core network domain, and a transmission domain); decompose network requirement information into subnet requirement information; orchestrate subnets provided by all domains together, so that subnets provided by different subdomains can meet a target service requirement or a target network requirement (for example, a service level agreement (SLA) requirement, a key performance indicator (KPI) requirement, or a quality of service (QoS) requirement); and perform management (for example, network resource deployment, configuration management, performance management, and fault management) on end-to-end network resources (for example, network functions, transmission resources, network elements, or air interface resources). The end-to-end network in the embodiments of this application may also be referred to as a network slice or an end-to-end (E2E) network slice. Specifically, the end-to-end network includes at least a core network (CN), an access network (AN), and a transport network (TN); or the end-to-end network may include any two of a CN, an AN, and a TN; or the end-to-end network may represent a CN, an AN, or a TN. In the embodiments of this application, the end-to-end network includes at least one network subnet. Logically, a network is a set of network functions. The network subnet herein may also be referred to as a network slice subnet. The network slice (NS) in the embodiments of this application may be understood as a communication resource used to ensure that a bearer service can meet the SLA requirement, and hard isolation (physical isolation) or soft isolated (logical isolation) may be performed on these resources according to different requirements. One network slice may be understood as a combination of network functions and resources required for completing a specific service (or some services), and is a complete logical network. In addition, the network slice in the embodiments of this application is a broad concept. It may be considered that a conventional network or a dedicated network is also a network slice, or it may be considered that a network slice subnet is also a network slice. Further, slice transmission in the embodiments of this application is a link between two 3rd generation partnership project (3GPP) nodes (for example, a link between network functions (NF) or a link between network elements (NE)), including a link between CN nodes, a link between a CN node and an AN node, and a link between AN nodes.

It should be noted that a name of the network management unit is not limited in the embodiments of this application. For example, the network management unit in the embodiments of this application may also be referred to as a cross-domain management unit, a cross-domain network slice management unit, or a network slice management unit. In the embodiments of this application, the network management unit may be an independent management unit, or may be a specific function in any management unit (for example, a network orchestration unit, a network management and orchestration unit, a service management unit, a service orchestration unit, a service management and orchestration unit, or a network function virtualization orchestrator (NFVO)). In addition, it should be further noted that the network management unit may be included or may be not included in the OSS.

The DM may also be understood as a network slice subnet management function (NSSMF). A main function of the DM includes a subnet management function, or an orchestration function, or both. Specifically, the DM may have some or all of the following functions:

The DM can perform domain management (including subnet life cycle management (creation, update, and deletion), subnet fault management, subnet performance management, subnet configuration management, and the like), and service management (including service life cycle management, service fault management, service performance management, service configuration management, and the like); coordinate network resources (for example, network functions (NF) or network elements (NE)); and perform management (for example, including network resource deployment, configuration management, performance management, and fault management) on intra-domain network resources (for example, network functions, transmission resources, network elements, or air interface resources). The subnet in the embodiments of this application may include one or more of the AN, the CN, and the TN. Specifically, the subnet in the embodiments of this application may be considered as a network function or a network element, and this is not limited. When a subnet managed by the domain management unit includes only the AN, the domain management unit may also be referred to as an AN DM; or when a subnet managed by the domain management unit includes only the CN, the domain management unit may also be referred to as a CN DM; or when a subnet managed by the domain management unit includes the AN and the CN, the domain management unit may be referred to as a mix domain management unit (mix DM). It should be noted that a name of the DM is not limited in the embodiments of this application. For example, the DM in the embodiments of this application may also be referred to as a domain slice management unit or a network slice subnet management unit. The DM in the embodiments of this application may be an independent management unit, or may be a specific function in any management unit (a network management unit, a network orchestration unit, a network management and orchestration unit, an element management unit, a network function management unit, a service management unit, a service orchestration unit, a domain management unit, a service management and orchestration unit, an NFVO, or the like). It should be further noted that the DM may be included or may be not included in the OSS.

The TN manager may also be referred to as a TN-DM. A main function of the TN manager includes a transport network management function, or a transport network orchestration function, or both. The TN manager may have some or all of the following functions:

The TN manager can perform transport network management (including transport network life cycle management (creation, update, and deletion), transport network fault management, transport network performance management, transport network configuration management, and the like). It should be noted that a name of the TN manager is not limited in the embodiments of this application. For example, the TN manager in the embodiments of this application may also be referred to as a subnet management unit, a transport network subnet management unit, or a network slice transport network management unit.

The TN-manager may be an independent management unit, or may be a specific function in any management unit (a network management unit, a network orchestration unit, a network management and orchestration unit, an element management unit, a network function management unit, a service management unit, a service orchestration unit, a domain management unit, a service management and orchestration unit, an NFVO, or the like). In addition, it should be further noted that the TN manager may be included or may be not included in the OSS.

In the embodiments of this application, the SMF, the NM, the DM, and the TN manager may be integrated into one physical device, or may be separately integrated into different physical devices. This is not limited in the embodiments of this application. For example, the DM and the NM, or the TN manager and the NM may be integrated into one physical device to perform network management, and the SMF may be integrated into one physical device to determine a network management request.

In the embodiments of this application, for ease of description, a device that performs network management is referred to as a first management device, and a device that determines network performance assurance information and sends a network management request is referred to as a second management device. It should be understood that the first management device and the second management device in the embodiments of this application may be physically-independent physical devices, or may be logically-independent functional units. When the first management device and the second management device are logically-independent functional units, the logically-independent functional units may be integrated into one physical device, or may be separately integrated into different physical devices. This is not limited in the embodiments of this application. For example, the first management device may be the DM, and the second management device may be the NM; or the first management device may be the NM, and the second management device may be the SMF; or the first management device may be the DM and the NM, and the second management device may be the SMF.

In the embodiments of this application, after determining a network management request, the second management device may send the network management request to the first management device, and the first management device manages a network based on the network management request sent by the second management device, so that the network meets the network management request sent by the second management device. In the embodiments of this application, the network managed by the first management device based on the network management request sent by the second management device may be referred to as a target network. The target network may be a network slice, or may be a network slice subnet. The network management request determined and sent by the second management device may be referred to as a target network management request. Further, in the embodiments of this application, the target network management request sent by the second management device may include network performance assurance information of the target network. After receiving the target network management request sent by the second management device, the first management device may manage the target network based on the network performance assurance information included in the target network management request, so that the target network meets the network performance assurance information included in the target network management request.

Currently, the network performance assurance information sent by the second management device is usually used to assure network performance (the network performance includes at least one of a latency, a bandwidth, a throughput rate, reliability, availability, a terminal guaranteed bit rate, and a service invocation success rate) for all terminals in the target network, so that the network performance of the target network can be assured for all the terminals in the entire network. However, in this manner, it is very difficult to assure performance of all the terminals in the entire network, and a high performance requirement is imposed on a target network device. In addition, during network performance evaluation, an evaluation failure probability is increased, and a network exception processing probability is increased. For example, if there are N terminals in the target network, and the network performance assurance information requires that a latency of the target network is 10 ms, the N terminals in the target network all need to meet the 10 ms latency, and this imposes a very high performance requirement on the first management device. During network performance evaluation, if N-1 terminals meet the 10 ms latency, but one terminal does not meet the 10 ms latency, the evaluation fails, and the first management device needs to perform exception processing on the target network. However, in an actual communication process, it may not be necessary to assure performance of all terminals in the target network, and only a specified proportion of terminals whose performance is assured needs to be reached.

In view of this, the embodiments of this application provide a network performance assurance method. In the method, a target network management request sent by a second management device includes network performance assurance information of a target network, the network performance assurance information includes at least one of a network performance assurance granularity and a network performance assurance condition, the network performance assurance granularity is used to describe a network performance assurance object of the target network, and the network performance assurance condition is used to describe a probability that a network performance assurance object meets network performance. Because of introduction of the network performance assurance granularity and the network performance assurance condition, it may not be necessary to assure performance of all terminals in the entire network provided that the network performance of the target network meets the network performance assurance granularity and/or the network performance assurance condition included in the network performance assurance information. This can lower a network device performance requirement, increase a network performance evaluation pass rate, and reduce an exception processing probability. For example, if the network performance assurance information requires that 90% of terminals accessing the target network have a 10 ms latency, 90% of terminals accessing the target network instead of all terminals accessing the target network are required to have the 10 ms latency when the first management device manages the target network. This reduces a performance requirement on the first management device. During network performance evaluation, if 90% of terminals have the 10 ms latency, it may be considered that the evaluation succeeds and no exception processing needs to be performed on the target network.

It should be noted that the terminal in the embodiments of this application is also referred to as user equipment (UE), a mobile station (MS), a mobile terminal (MT), or the like, and is a device that provides a user with voice and/or data connectivity, for example, a hand-held device or a vehicle-mounted device having a wireless connection function. Currently, the terminal is, for example, a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote surgery, a wireless terminal in a smart grid, a wireless terminal in transportation safety, a wireless terminal in a smart city, or a wireless terminal in a smart home. The terminal in the embodiments of this application may also be referred to as a user.

Figure 2:
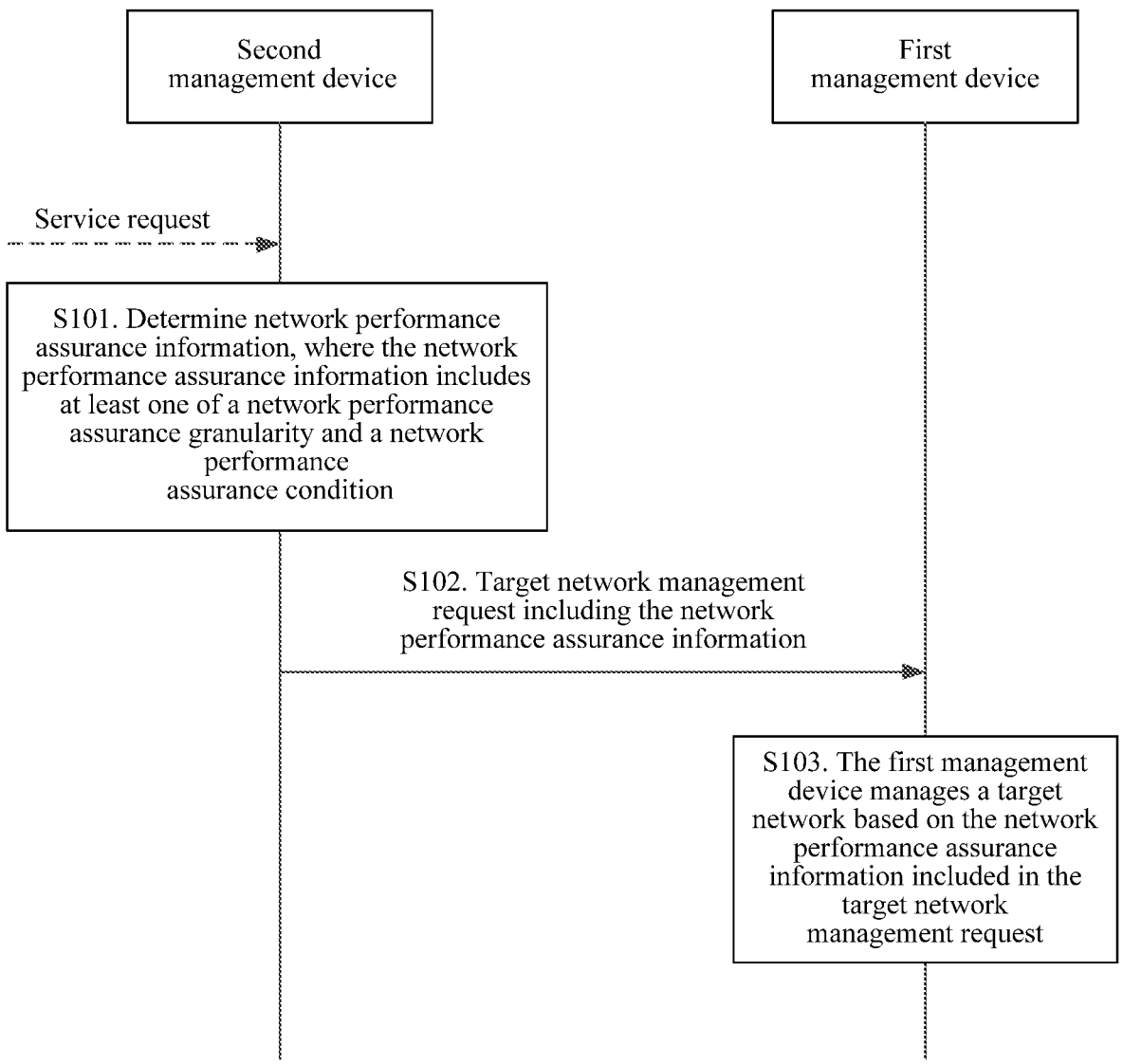
FIG. 2 is an implementation flowchart of a network performance assurance method according to an embodiment of this application.

FIG. 2 shows a network performance assurance method according to an embodiment of this application. As shown in FIG. 2, the method includes the following steps:

S101. A second management device determines network performance assurance information, where the network performance assurance information includes at least one of a network performance assurance granularity and a network performance assurance condition.

S102. The second management device sends a target network management request including the network performance assurance information to a first management device, and the first management device receives the target network management request sent by the second management device.

S103. The first management device manages a target network based on the network performance assurance information included in the target network management request.

According to the network performance assurance method provided in this embodiment of this application, the network performance assurance information includes the at least one of the network performance assurance granularity and the network performance assurance condition. Therefore, it may not be necessary to assure performance of terminals in the entire network provided that network performance of the target network meets the network performance assurance granularity and/or the network performance assurance condition included in the network performance assurance information. This can lower a network device performance requirement, increase a network performance evaluation pass rate, and reduce an exception processing probability.

In this embodiment of this application, specific implementation processes of performing steps S101, S102, and S103 are described below by using examples.

In S101, the second management device (for example, an SMF) may receive a service request. The service request includes service performance assurance information, and the service performance assurance information includes at least one of a service performance assurance granularity and a service performance assurance condition.

The service performance assurance information may further include an applicable condition corresponding to the service performance assurance information, in other words, an applicable condition corresponding to the at least one of the service performance assurance granularity and the service performance assurance condition.

In this embodiment of this application, service performance may include at least one of a latency, a throughput rate, reliability, availability, a terminal guaranteed bit rate, a service invocation success rate, and the like. The latency indicates a time required by a terminal to use a service provided by the target network. The service invocation success rate may be a probability that a service provided by the target network is successfully invoked by the terminal. The terminal guaranteed bit rate is a data transmission quantity required by the terminal to use a service provided by the target network. The throughput rate indicates a second-level data forwarding capability of a service provided by the target network. The reliability indicates a continuous working capability of a service provided by the target network. The availability indicates a capability that a service provided by the target network provides a required function at a specified time point or within a specified time period.

In this embodiment of this application, the service performance assurance granularity is used to describe a service performance assurance object, and the service performance assurance object may be at least one of a single terminal, a cell, a region, a terminal group (UE Group), and a tenant. An example in which the service performance is a minimum terminal guaranteed bit rate of 20 Mbps is used to describe the service performance assurance object. If the service performance assurance object is a terminal, it indicates that the service performance assurance granularity is a single terminal, and a minimum guaranteed bit rate at which each terminal in the target network uses a service needs to be greater than or equal to 20 Mbps. If the service performance assurance object is a cell, it indicates that the service performance assurance granularity is a cell, and an average rate at which all terminals use a service provided by each cell in the target network needs to be greater than or equal to 20 Mbps. If the service performance assurance object is a region, it indicates that the service performance assurance granularity is a region, and an average rate at which all UEs in a specific region in the target network use a service needs to be greater than or equal to 20 Mbps. If the service performance assurance object is a terminal group, it indicates that the service performance assurance granularity is a terminal group, and an average rate at which all terminals in the group use a service provided by the target network needs to be greater than or equal to 20 Mbps. If the service performance assurance object is a tenant, it indicates that the service performance assurance granularity is a tenant, and an average rate at which all terminals of the tenant use a service provided by the target network needs to be greater than or equal to 20 Mbps.

In this embodiment of this application, the service performance assurance condition is used to describe a probability that a service performance assurance object meets the service performance or a probability that the network performance assurance object does not meet the network performance. For example, the probability that a service performance assurance object meets the service performance includes at least one of the following proportions: a proportion of service performance assurance objects that meet the service performance in all service performance assurance objects; a proportion of network performance assurance objects that do not meet the network performance in all network performance assurance objects; a proportion of a usage time in which the service performance is met in a service usage process of the service performance assurance object in a total time; and a proportion of a usage time in which the service performance is not met in a service usage process of the network performance assurance object in a total time. An example in which the service performance is a minimum terminal guaranteed bit rate of 20 Mbps is used to describe the service performance assurance condition. When the probability that a service performance assurance object meets the service performance is the proportion of the service performance assurance objects that meet the service performance in all the service performance assurance objects, and the proportion is 80%, it indicates that a guaranteed bit rate of each of 80% of terminals using a service in the target network needs to be greater than or equal to 20 Mbps. When the probability that a service performance assurance object meets the service performance is a proportion of service performance assurance objects that do not meet the service performance in all the service performance assurance objects, and the proportion is 20%, it indicates that at least 20% of terminals using a service in the target network do not meet a requirement that a user rate is greater than or equal to 20 Mbps. In the service usage process of the service performance assurance object, when the probability that a service performance assurance object meets the service performance is the proportion of the usage time in which the service performance is met in the total time, and the proportion is 80%, it indicates that a requirement that a guaranteed bit rate is greater than or equal to 80% needs to be met in 80% of a time in a process of using a service by each terminal using a service in the target network. In the service usage process of the service performance assurance object, when a probability that a service performance assurance object does not meet the service performance is a proportion of a usage time in which the service performance is not met in a total time, and the proportion is 20%, it indicates that a requirement that a guaranteed bit rate is greater than or equal to 80% is not met in at least 20% of a time in a process of using a service by each terminal using a service in the target network.

In this embodiment of this application, the service performance assurance information may include the service performance assurance granularity, or may include the service performance assurance condition, or may include the service performance assurance granularity and the service performance assurance condition. An example in which the service performance assurance information includes the service performance assurance granularity and the service performance assurance condition is used for description. The service performance assurance information may be as follows: in a shopping mall, 90% of terminals need to meet specified service performance and each terminal needs to meet the specified service performance within 90% of a time in a service usage process; and in a suburban area, 80% of terminals need to meet specified service performance and each terminal needs to meet the specified service performance within 80% of a time in a service usage process.

In this embodiment of this application, the applicable condition corresponding to the service performance assurance information may be a specified condition for using the service performance assurance information. For example, the service performance assurance information includes an applicable condition corresponding to the service performance assurance granularity, or an applicable condition corresponding to the service performance assurance condition, or an applicable condition corresponding to the service performance assurance granularity and the service performance assurance condition. If the service performance assurance granularity is a terminal, the service performance assurance condition is that the proportion of the service performance assurance objects that meet the service performance in all the service performance assurance objects is 90%, and the applicable condition corresponding to the service performance assurance granularity and the service performance assurance condition is an off-peak time, the service performance assurance information may indicate that 90% of terminals meet the service performance in the off-peak time. If the service performance assurance granularity is a terminal, the service performance assurance condition is that the proportion of the service performance assurance objects that meet the service performance in all the service performance assurance objects is 80%, and the applicable condition corresponding to the service performance assurance granularity and the service performance assurance condition is a busy time, the service performance assurance information may indicate that 80% of terminals meet the service performance in the busy time.

In this embodiment of this application, the applicable condition corresponding to the service performance assurance information may be a user group that uses the service performance assurance information. For example, the service performance assurance information includes an applicable condition corresponding to the service performance assurance granularity and the service performance assurance granularity. If the service performance assurance granularity is a terminal, and the applicable condition of the service performance assurance granularity is for a VIP user group and a common user group, the service performance assurance information may indicate that each terminal in the VIP user group meets a first guaranteed bit rate, each terminal in the common user group meets a second guaranteed bit rate, and the first guaranteed bit rate is greater than the second guaranteed bit rate.

In this embodiment of this application, after receiving the service request including the service performance assurance information, the second management device (for example, the SMF) may determine the network performance assurance information of the target network based on the service performance assurance information included in the service request.

In this embodiment of this application, the network performance of the target network may include at least one of a latency, a bandwidth, reliability, availability, a terminal guaranteed bit rate supported by the network, a service invocation success rate supported by a network, and the like. In this embodiment of this application, the network performance assurance information includes the at least one of the network performance assurance granularity and the network performance assurance condition. The network performance assurance granularity is used to describe a network performance assurance object of the target network, and the network performance assurance condition is used to describe a probability that a network performance assurance object meets network performance. The network performance assurance information may further include an applicable condition of the network performance assurance information. In this embodiment of this application, specific definitions of the network performance assurance granularity, the network performance assurance condition, and the applicable condition corresponding to the network performance assurance information may be similar to those of the service performance assurance granularity, the service performance assurance condition, and the applicable condition corresponding to the service performance assurance information described above. For example, the foregoing service performance may be replaced with the network performance, and a specific definition is not described herein again.

Specifically, the second management device may use the service performance assurance information included in the service request as the network performance assurance information of the target network. For example, the network latency of the target network may be equal to a service latency included in the service request, and a terminal guaranteed bit rate of the target network is a rate at which the terminal accesses the target network to transmit data, and may be equal to a terminal guaranteed bit rate included in the service request. The second management device may alternatively convert the service performance assurance information included in the service request into the network performance assurance information of the target network. For example, the bandwidth of the target network is a range of a transmission frequency that can be carried in the target network, and may be calculated by using a specific formula for a service throughput rate. The reliability of the target network indicates a continuous working capability of the target network, and can be obtained through calculation based on service reliability.

It can be understood that, in this embodiment of this application, if the target network is a network slice, the network performance assurance information of the target network may be understood as network performance assurance information of the network slice.

In S102, the target network management request received by the first management device includes the network performance assurance information of the target network, the network performance assurance information includes the at least one of the network performance assurance granularity and the network performance assurance condition, the network performance assurance granularity is used to describe the network performance assurance object of the target network, and the network performance assurance condition is used to describe the probability that a network performance assurance object meets network performance or a probability that the network performance assurance object does not meet network performance.

In S103, the first management device may manage the target network based on the network performance assurance information included in the target network management request in the following implementations:

In a possible implementation, in this embodiment of this application, the first management device may select or create a network that meets the network performance assurance information included in the target network management request, to serve as the target network. For example, when the network performance assurance information includes the network performance assurance granularity, the first management device may select or create a network in which network performance assurance is performed based on the network performance assurance granularity included in the target network management request, to serve as the target network. For example, the network performance assurance granularity is that each terminal meets a specified latency requirement. If an existing network includes a first network in which a specified latency requirement can be assured for each terminal and a second network in which the specified latency requirement can be assured for each terminal and each cell, the first management device may select at least one of the first network and the second network as the target network. If the existing network does not include a network in which a specified latency requirement can be assured for each terminal, the first management device may select a network component that can assure the specified latency requirement for each terminal, to create a new network, so that the specified latency requirement can be assured for each terminal in the new created network; and use the new created network as the target network.

In this embodiment of this application, if the network performance assurance information includes the network performance assurance condition, the first management device may select or create a network that meets the network performance assurance condition included in the target network management request, to serve as the target network. For example, the network performance assurance condition is that a latency of each of 80% of terminals is less than 5 ms. If an existing network includes a third network in which a latency of each of 80% of terminals is less than 5 ms and a fourth network in which a latency of each of 90% of terminals is less than 5 ms, the first management device may select at least one of the third network and the fourth network as the target network. If the existing network does not include a network in which a latency of each of 80% of terminals is less than 5 ms, the first management device may select a network component that supports a requirement that a latency of each of 80% of terminals is less than 5 ms, to create a new network, so that a latency of each of 80% of terminals needs to be less than 5 ms in the new created network; and uses the new created network as the target network.

In this embodiment of this application, if the network performance assurance information includes the network performance assurance condition and the network performance assurance granularity, the first management device may select or create a network in which network performance assurance is performed based on the network performance assurance granularity and that meets the network performance assurance condition, to serve as the target network. An example in which the network performance assurance granularity is that each terminal meets a specified latency requirement and the network performance assurance condition is that a latency of each of 80% of terminals is less than 5 ms is used for description. In this case, when selecting a network, the first management device needs to select an existing network that meets the foregoing network performance assurance granularity and network performance assurance condition, to serve as the target network; or select a network component that supports the foregoing network performance assurance granularity and network performance assurance condition, to create a new network serving as the target network, so that a latency of each of 80% of terminals needs to be less than 5 ms in the selected or created target network.

In this embodiment of this application, if the network performance assurance information further includes the applicable condition corresponding to the network performance assurance information, the first management device may select the network performance assurance information based on the applicable condition, to perform network performance assurance. For example, if the network performance assurance information is that a latency of each of 90% of terminals is less than 5 ms in an off-peak time and a latency of each of 80% of terminals is less than 5 ms in a busy time, the first management device first determines whether a current time is an off-peak time or a busy time, and then determines whether the network performance assurance information is that a latency of each of 90% of terminals is less than 5 ms or a latency of each of 80% of terminals is less than 5 ms. Alternatively, for example, if the network performance assurance information is that a latency of each of 90% of terminals is less than 5 ms when a quantity of terminals is less than 10 W, or is that a latency of each of 80% of terminals is less than 5 ms when a quantity of terminals is greater than 10 W, the first management unit first determines a quantity of terminals in the target network. If the quantity of terminals is less than 10 W, the performance assurance information is that a latency of each of 90% of terminals is less than 5 ms; or if the quantity of terminals is greater than 10 W, a latency of each of 80% of terminals is less than 5 ms.

In this embodiment of this application, after the first management device selects or creates the network that meets the network performance assurance information, to serve as the target network, the first management device may further evaluate network performance of the selected or created network in a process in which the selected or created network runs. In other words, the first management device determines whether the selected or created network meets the network performance assurance information included in the target network management request in the running process. The first management device may further determine, based on an evaluation result, whether to perform exception processing. In this embodiment of this application, if the first management device determines that the selected or created network does not meet the network performance assurance information in the running process, the first management device performs exception processing.

In this embodiment of this application, when performing exception processing, the first management device may adjust the selected or created network, so that an adjusted network meets the network performance assurance information. In this embodiment of this application, the first management device may adjust the selected or created network in at least one of the following manners: modifying a topology structure of the selected or created network; adjusting a transport network between network components in the selected or created network; replacing a network component in the selected or created network with a new network component; upgrading a network component in the selected or created network; and configuring a network component in the network. The configuring a network component may include: when the network component in the network is a base station or a wireless network including a base station, configuring an antenna of the base station, configuring an optimization policy (including a handover policy and the like) of the base station, adding a resource, or the like.

In this embodiment of this application, when performing exception processing, the first management device may send a network performance assurance exception notification to the second management device, to notify the second management device that the current target network cannot meet the network performance assurance information in the target network management request.

In another possible implementation, the first management device may configure the network performance assurance information in the target network or management information of the target network, so that the target network meets the configured network performance assurance information. Specifically, configuring the network performance assurance information in the target network may be understood as follows: The first management device stores the network performance assurance information in the target network or sends the network performance assurance information to the target network. Configuring the network performance assurance information in the management information of the target network may be understood as follows: The first management device stores the network performance assurance information in the management information of the target network.

In this embodiment of this application, if the network performance assurance information includes the network performance assurance granularity, the first management device may configure the network performance assurance granularity in the target network or in the management information of the target network. For example, the first management device sets a latency of each terminal to be less than 5 ms. That the first management device sets, in the target network or in the management information of the target network, the latency of each terminal to be less than 5 ms may be understood as follows: It needs to be assured that a latency of accessing a network by each terminal is less than 5 ms when the target network is running. In this embodiment of this application, if the network performance assurance information includes the network performance assurance condition, the first management device may configure the network performance assurance condition in the target network or in the management information of the target network. For example, the first management device sets a latency of each of 80% of terminals to be less than 5 ms. That the first management device sets, in the target network or in the management information of the target network, a latency of each of 80% of terminals is less than 5 ms may be understood as follows: It needs to be assured that a latency of each of 80% of terminals accessing the network is less than 5 ms when the target network is running.

In this embodiment of this application, after configuring the network performance assurance information in the target network or in the management information of the target network, the first management device may perform, in a process in which the target network provided with the network performance assurance information runs, performance evaluation on the target network provided with the network performance assurance information. In other words, the first management device determines whether the target network provided with the network performance assurance information meets the network performance assurance information in the target network management request in the running process. In this embodiment of this application, if the first management device determines that the target network provided with the network performance assurance information does not meet the network performance assurance information in the target network management request in the running process, the first management device performs exception processing on the target network. A process in which the first management device performs exception processing on the target network is similar to a process in which the first management device performs exception processing on the selected or created network. Details are not described herein in this embodiment of this application.

It can be understood that, in this embodiment of this application, the first management device may be a DM, and the second management device may be an NM; or the first management device may be an NM, or a DM and an NM, and the second management device may be the SMF.

In this embodiment of this application, when the first management device is the DM, the target network management request received by the first management device may be a network slice subnet request, the network slice subnet request includes network performance assurance information of a network slice subnet, the network performance assurance information of the network slice subnet may include at least one of a performance assurance granularity of the network slice subnet, a performance assurance condition of the network slice subnet, and an applicable condition of the network performance assurance information of the network slice subnet. The first management device may manage the network slice subnet based on the network performance assurance information of the network slice subnet. In this embodiment of this application, when the first management device is the NM, the target network management request received by the first management device may be a network slice request, the network slice request includes network performance assurance information of a network slice, the network performance assurance information may include at least one of a performance assurance granularity of the network slice, a performance assurance condition of the network slice, and an applicable condition of the network performance assurance information of the network slice. The first management device may manage the network slice based on the network performance assurance information of the network slice. In this embodiment of this application, when the first management device is the DM and the NM, the target network management request received by the NM in the first management device may be a network slice request, and the NM in the first management device may determine a network slice subnet request based on the network slice request, and send the network slice subnet request to the DM.

In another possible implementation, the first management device may adjust the target network, so that an adjusted network can meet the network performance assurance information. Specifically, in this embodiment of this application, the first management device may adjust the selected or created network in at least one of the following manners: modifying a topology structure of the selected or created network; adjusting a transport network between network components in the selected or created network; replacing a network component in the selected or created network with a new network component; upgrading a network component in the selected or created network; and configuring a network component in the network. The configuring a network component may include: when the network component in the network is a base station or a wireless network including a base station, configuring an antenna of the base station, configuring an optimization policy (including a handover policy and the like) of the base station, adding a resource, or the like.

Figure 3:
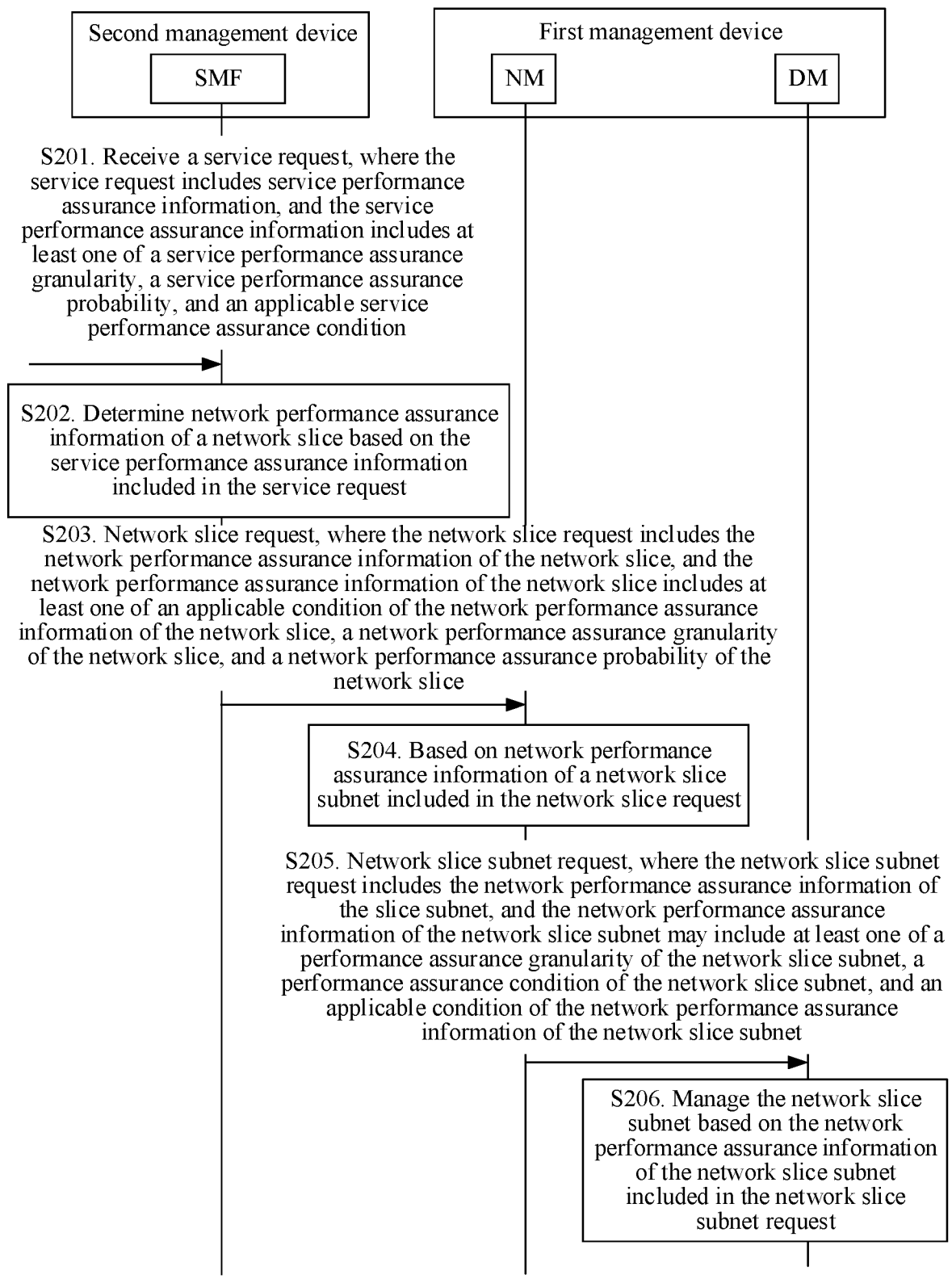
FIG. 3 is an implementation example diagram of a network performance assurance method according to an embodiment of this application.

In this embodiment of this application, an example in which the first management device includes an NM and a DM, the second management device is an SMF, and the target network is a network slice subnet is used below to describe the network performance assurance method in the foregoing embodiment. In this embodiment of this application, when the first management device includes the NM and the DM, and the second management device is the SMF, FIG. 3 is a schematic diagram of a network performance assurance process. The network performance assurance implementation process shown in FIG. 3 mainly includes the following steps.

S201. The SMF receives a service request, where the service request includes service performance assurance information, and the service performance assurance information includes at least one of a service performance assurance granularity, a service performance assurance probability, and an applicable service performance assurance condition.

For the service performance assurance information included in the service request received by the SMF, refer to a process in which the second management device receives the service request in the foregoing embodiment. Details are not described herein again.

S202. The SMF determines network performance assurance information of a network slice based on the service performance assurance information included in the service request.

For a process in which the SMF determines the network performance assurance information of the network slice, refer to the descriptions of a process in which the second management device determines the target network management request in the foregoing embodiment. Details are not described herein again.

S203. The SMF sends a network slice request to the NM, where the network slice request includes the network performance assurance information of the network slice, and the network performance assurance information of the network slice includes at least one of an applicable condition of the network performance assurance information of the network slice, a network performance assurance granularity of the network slice, and a network performance assurance probability of the network slice.

S204. The NM manages the network slice based on the network performance assurance information of the network slice, and determines network performance assurance information of a corresponding network slice subnet based on the network performance assurance information of the network slice.

In this embodiment of this application, when the NM manages the network slice based on the network performance assurance information of the network slice, if the network slice includes at least one network slice subnet, the NM may determine the network performance assurance information of the corresponding network slice subnet based on the network performance assurance information of the network slice. The network performance assurance information of the network slice subnet may include at least one of a performance assurance granularity of the network slice subnet, a performance assurance condition of the network slice subnet, and an applicable condition of the network performance assurance information of the network slice subnet.

Specifically, when determining the network performance assurance information of the corresponding network slice subnet based on the network performance assurance information of the network slice, the NM may perform determining in different manners based on specific composition of the network slice subnet. For example, when the network slice subnet includes a core network, an access network, and a transport network, the NM may determine that the network performance assurance information of the network slice is the network performance assurance information of the network slice subnet. When the network slice subnet includes one or two of a core network, an access network, and a transport network, the NM may decompose the network slice performance assurance information into network slice subnet performance assurance information. For example, a subnet 1 includes only an access network, a subnet 2 includes only an access network, and a subnet 3 includes only a transport network. If the network performance assurance information of the network slice includes latency assurance, the NM may separately allocate a latency to the subnet 1, the subnet 2, and the subnet 3, so that a sum of the latency of the subnet 1, the latency of the subnet 2, and the latency of the subnet 3 is equal to a latency of the network slice. If the network performance assurance information of the network slice includes invocation success rate assurance, the NM may separately allocate an invocation success rate to the subnet 1, the subnet 2, and the subnet 3, so that a product of the invocation success rate of the subnet 1, the invocation success rate of the subnet 2, and the invocation success rate of the subnet 3 is equal to an invocation success rate of the network slice.

S205. The NM determines the network performance assurance information of the network slice subnet, and sends a network slice subnet request including the network performance assurance information of the network slice subnet to the DM.

In this embodiment of this application, the network performance assurance information of the network slice subnet may include the at least one of the performance assurance granularity of the network slice subnet, the performance assurance condition of the network slice subnet, and the applicable condition corresponding to the network performance assurance information of the network slice subnet.

S206. The DM receives the network slice subnet request sent by the NM, and manages the network slice subnet based on the network performance assurance information of the network slice subnet included in the network slice subnet request.

Specifically, based on the network performance assurance information of the network slice subnet, the DM may select a corresponding network function to constitute the network slice subnet, or configure the network performance assurance information of the network slice subnet, or adjust the network slice subnet. The DM may further determine whether the network performance assurance information corresponding to the network slice subnet meets the network performance assurance information of the network slice subnet in the network slice subnet request in a running process of the network slice subnet. When the network performance assurance information does not meet the network performance assurance information of the network slice subnet in the network slice subnet request in the running process of the network slice subnet, the DM adjusts the network slice subnet, so that an adjusted network slice subnet meets the network performance assurance information of the network slice subnet; or the DM sends a network performance assurance exception notification to the NM, and the NM sends the network performance assurance exception notification to the SMF, so that the SMF determines that a network performance assurance exception occurs in the network slice subnet.

In this embodiment of this application, the target network management request sent by the second management device to the first management device includes the at least one of the network performance assurance granularity, the network performance assurance condition, and the applicable condition corresponding to the network performance assurance information. This can lower a performance requirement for managing the target network by the first management device, increase a network performance evaluation pass probability, and reduce an exception processing probability. In addition, in this embodiment of this application, the applicable condition of the network performance assurance information, the network performance assurance granularity, and the network performance assurance condition are introduced into the network performance assurance information. Different network performance assurance information may be determined based on different scenarios, to perform different network performance assurance, so that network performance assurance is more flexible.

In another embodiment of this application, the first management device may send network performance assurance capability information supported by the target network to the second management device. After receiving the network performance assurance capability information supported by the target network that is sent by the first management device, the second management device may determine the network performance assurance information in the target network management request based on the network performance assurance capability information supported by the target network, so that the determined network performance assurance information can be supported by the target network.

Figure 4:
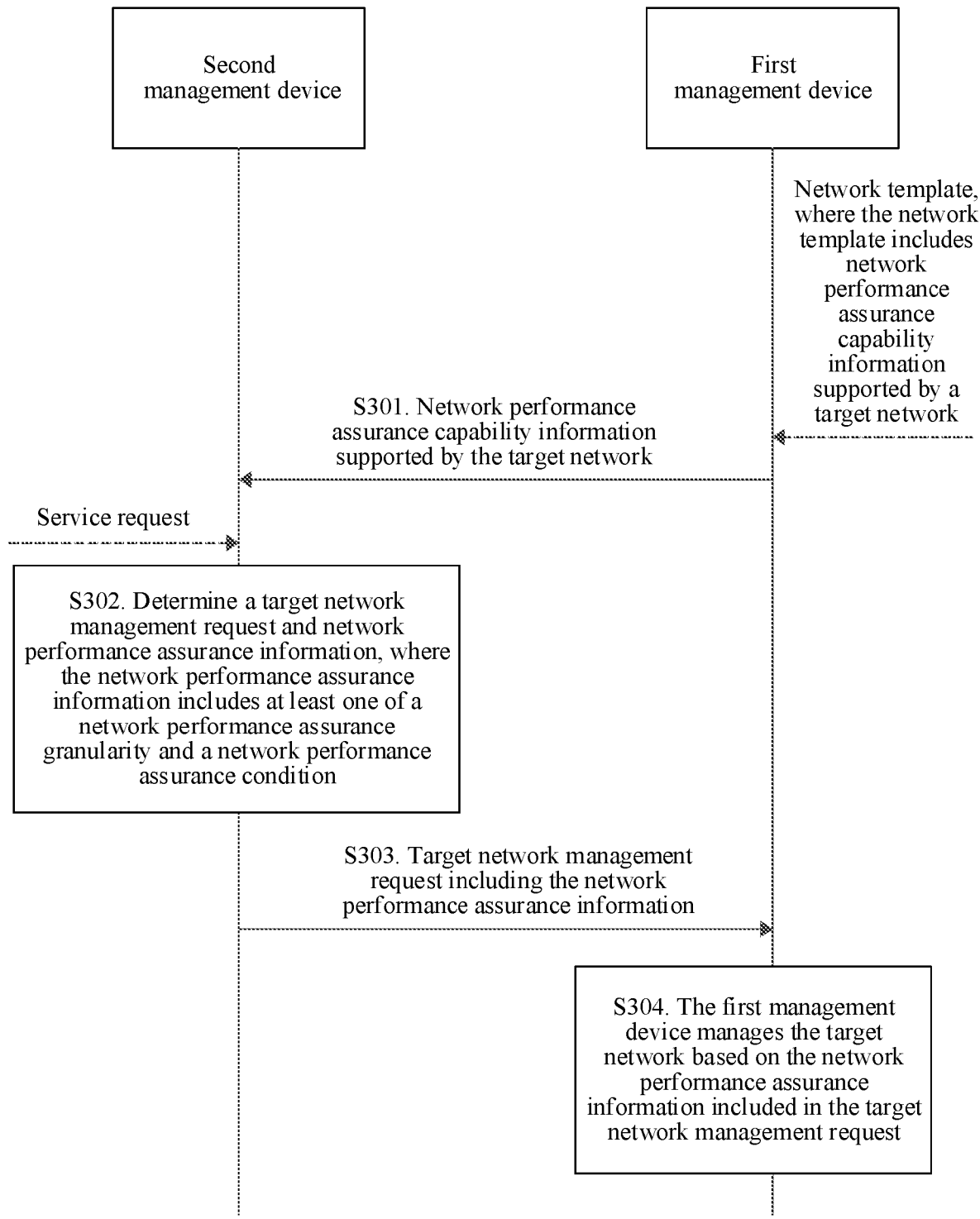
FIG. 4 is an implementation flowchart of another network performance assurance method according to an embodiment of this application.

FIG. 4 is an implementation flowchart of another network performance assurance method according to an embodiment of this application. In a method procedure shown in FIG. 4, execution steps S302, S303, and S304 are similar to execution steps S101, S102, and S103 in FIG. 2. Details are not described herein again. The following describes only different implementation steps.

S301. A first management device sends at least one piece of network performance assurance capability information supported by a target network to a second management device, and the second management device receives the at least one piece of network performance assurance capability information supported by the target network that is sent by the first management device.

In this embodiment of this application, the network performance assurance capability information supported by the target network may include network performance assurance information of the target network, for example, may include at least one of a network performance assurance granularity supported by the target network and a network performance assurance condition supported by the target network. The network performance assurance capability information supported by the target network may further include an applicable condition corresponding to the network performance assurance capability information supported by the target network.

In this embodiment of this application, the second management device may determine the network performance assurance information based on the at least one piece of received network performance assurance capability information supported by the target network. For example, the second management device may select one or more pieces of the at least one piece of network performance assurance capability information supported by the target network, to serve as the network performance assurance information of the target network.

In a possible implementation, before sending the at least one piece of network performance assurance capability information supported by the target network to the second management device, the first management device may obtain a network template corresponding to the target network. The network template corresponding to the target network is used to deploy a network component in the target network, and may also be referred to as a network component template. The network template includes the at least one piece of network performance assurance capability information supported by the target network. After obtaining the network template corresponding to the target network, the first management device may determine, based on the at least one piece of network performance assurance capability information included in the network template, the network performance assurance capability information supported by the target network.

It can be understood that the target network in this embodiment of this application may be a network slice. If the target network is the network slice, the network template may be understood as a network slice template.

It can be further understood that, in this embodiment of this application, the first management device may be a DM, and the second management device may be an NM; or the first management device may be an NM, or a DM and an NM, and the second management device may be an SMF.

Figure 5:
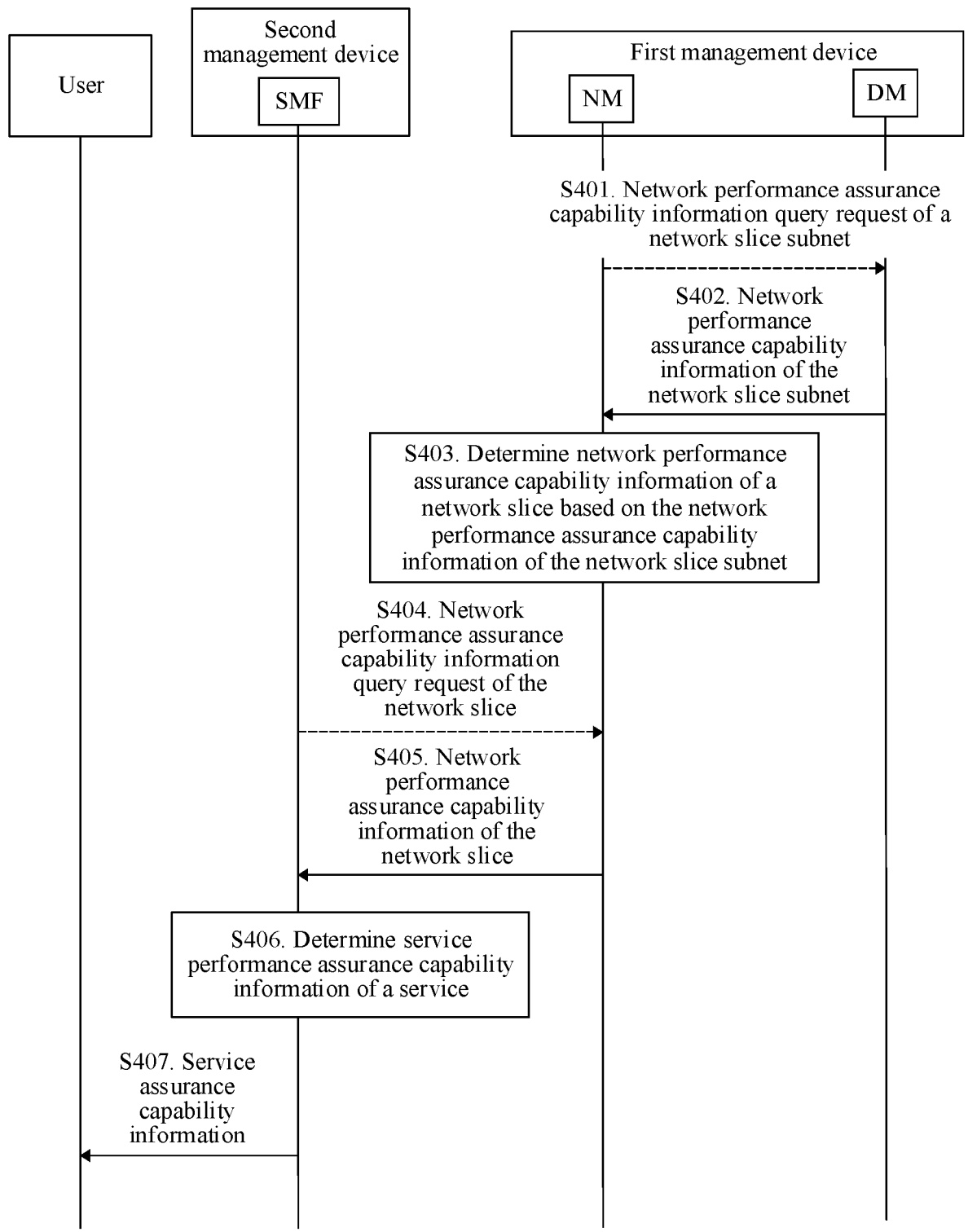
FIG. 5 is an implementation example diagram of another network performance assurance method according to an embodiment of this application.

In this embodiment of this application, an example in which the first management device includes an NM and a DM, the second management device is an SMF, and the target network is a network slice subnet is still used for description. For a specific implementation process, refer to FIG. 5.

S401. The NM sends, to the DM, a request for querying network performance assurance capability information supported by the network slice subnet, and the DM receives the request that is for querying the network performance assurance capability information and that is sent by the NM.

S401 is an optional step.

S402. The DM sends at least one piece of network performance assurance capability information supported by the network slice subnet to the NM.

The network performance assurance capability information supported by the network slice subnet may be understood as network performance assurance capability information of a network component in the network slice subnet.

In a possible example, the DM obtains a network slice subnet template, and the network slice subnet template includes the at least one piece of network performance assurance capability information supported by the network slice subnet.

S403. The NM receives the at least one piece of network performance assurance capability information supported by the network slice subnet that is sent by the DM, and determines network performance assurance capability information of a network slice based on the at least one piece of network performance assurance capability information supported by the network slice subnet.

In this embodiment of this application, the NM may determine that the at least one piece of network performance assurance capability information supported by the network slice subnet is the network performance assurance capability information of the network slice. For example, when the network slice subnet includes an AN, a CN, and a TN, and network performance is a latency, the NM may use a latency assurance capability of the network slice subnet as a latency assurance capability of the network slice. The NM may further determine that the network performance assurance capability of the network slice subnet is the network performance assurance capability of the network slice. For example, the network slice subnet includes a subnet 1, a subnet 2, and a subnet 3. The subnet 1 includes only an AN, and network assurance capability information is a terminal assurance granularity. The subnet 2 includes only a CN, and network assurance capability information is a terminal assurance granularity. The subnet 3 includes only a TN, and network assurance capability information is a cell assurance granularity. In this case, the NM may determine that network assurance capability information of the network slice is the cell assurance granularity. For another example, the network slice subnet includes a subnet 1, a subnet 2, and a subnet 3. The subnet 1 includes only an AN, network assurance capability information is a network performance assurance condition, and the network performance assurance condition is that 90% of terminals meet network performance. The subnet 2 includes only a CN, network assurance capability information is a network performance assurance condition, and the network performance assurance condition is that 90% of terminals meet the network performance. The subnet 3 includes only a TN, network assurance capability information is a network performance assurance condition, and the network performance assurance condition is that 95% of terminals meet the network performance. In this case, the NM may determine the network assurance capability information of the network slice as a network performance assurance condition, and the network performance assurance condition is that 90%*90%*95% of terminals meet the network performance. For another example, the network slice subnet includes a subnet 1 and a subnet 2. The subnet 1 includes an AN and a CN, network assurance capability information is a network performance assurance condition, and the network performance assurance condition is that 80% or 90% of terminals meet network performance. The subnet 2 includes only a TN, network assurance capability information is a network performance assurance condition, and the network performance assurance condition is that 92% or 95% of terminals meet the network performance. In this case, the NM may determine the network assurance capability information of the network slice as a network performance assurance condition, and the network performance assurance condition may be that 80%×92% of terminals meet the network performance, or 80%×95% of terminals meet the network performance, or 90%×92% of terminals meet the network performance, or 90%×95% of terminals meet the network performance.

In a possible embodiment, the NM may obtain, by reading a network slice template, at least one piece of network performance assurance capability information supported by the network slice.

S404. The SMF sends, to the NM, a request for querying the network performance assurance capability information supported by the network slice, and the NM receives the request that is for querying the network performance assurance capability information supported by the network slice and that is sent by the SMF.

S404 is an optional step.

S405. The NM sends the at least one piece of network performance assurance capability information supported by the network slice to the SMF.

S406. The SMF determines service performance assurance capability information of a service, where the service is provided by the network slice.

Specifically, the SMF may select network performance assurance capability information from the at least one piece of network performance assurance capability information supported by the network slice, and use the selected network performance assurance capability information as the service performance assurance capability information of the service, or convert the selected network performance assurance capability information into the service performance assurance capability information of the service.

S407. The SMF sends the determined service performance assurance capability information to a user.

In this embodiment of this application, after determining the service performance assurance capability information, the SMF may send the service performance assurance capability information to the user; the user determines service performance assurance information in a service request based on the service performance assurance capability information, and sends the service request including the service performance assurance information to the SMF; and the SMF may perform step S201 after receiving the service request. In this embodiment of this application, for an implementation process in which the SMF performs network performance assurance after receiving the service request, refer to the implementation process shown in FIG. 3. Details are not described in this embodiment of this application again.

In this embodiment of this application, the first management device sends the at least one piece of network performance assurance capability information supported by the target network to the second management device. After receiving the at least one piece of network performance assurance capability information supported by the target network that is sent by the first management device, the second management device may determine the network performance assurance information in the target network management request based on the at least one piece of network performance assurance capability information supported by the target network, so that the determined network performance assurance information can be supported by the target network.

The foregoing mainly describes the solutions provided in the embodiments of this application from the perspective of interaction between the first management device and the second management device. It can be understood that, to implement the foregoing functions, the first management device and the second management device include corresponding hardware structures and/or software units for performing the functions. With reference to the units and algorithm steps described in the embodiments disclosed in this application, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, functional units of the first management device and the second management device may be obtained through division based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in the embodiments of this application, unit division is an example, and is merely a logical function division. During actual implementation, another division manner may be used.

Based on a same concept as the foregoing method embodiment, an embodiment of this application provides a network performance assurance apparatus.

Figure 6:
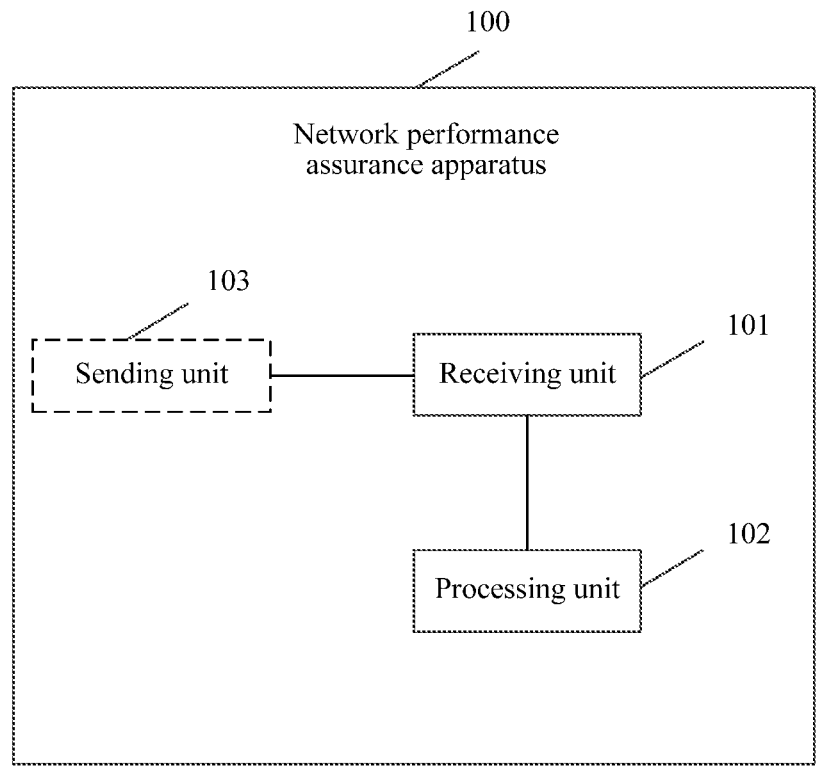
FIG. 6 is a schematic structural diagram of a network performance assurance apparatus applied to a first management device according to an embodiment of this application.

When an integrated unit is used, FIG. 6 is a schematic diagram of a possible logical structure of a network performance assurance apparatus. The network performance assurance apparatus may be applied to a first management device. As shown in FIG. 6, a network performance assurance apparatus 100 includes a receiving unit 101 and a processing unit 102. The receiving unit 101 is configured to receive a target network management request sent by a second management device, where the target network management request includes network performance assurance information of the target network, the network performance assurance information includes at least one of a network performance assurance granularity and a network performance assurance condition, the network performance assurance granularity is used to describe a network performance assurance object of the target network, and the network performance assurance condition is used to describe a probability that a network performance assurance object meets network performance. The processing unit 102 is configured to manage the target network based on the network performance assurance information included in the target network management request received by the receiving unit 101. Specifically, the processing unit 102 may adjust the target network based on the network performance assurance information, so that an adjusted target network can meet the network performance assurance information.

The network performance assurance object includes at least one of a terminal, a cell, a region, a terminal group, and a tenant. The probability that a network performance assurance object meets network performance includes at least one of the following proportions: a proportion of network performance assurance objects that meet the network performance in all network performance assurance objects, and a proportion of a usage time in which service performance is met in a service usage process of the network performance assurance object in a total time.

In a possible embodiment, the target network management request further includes an applicable condition corresponding to the network performance assurance information.

In a possible embodiment, the processing unit 102 may manage the target network based on the network performance assurance information in the following manner:

selecting or creating a network that meets the network performance assurance information, to serve as the target network; or configuring the network performance assurance information in the target network or in management information of the target network, so that the target network meets the network performance assurance information.

After selecting or creating the network that meets the network performance assurance information, to serve as the target network, the processing unit 102 may further determine whether the selected or created network meets the network performance assurance information in a running process. If determining that the selected or created network does not meet the network performance assurance information in the running process, the processing unit 102 performs exception processing.

After configuring the network performance assurance information in the target network or in the management information of the target network, the processing unit 102 may further determine whether the target network in which the network performance assurance information is configured meets the network performance assurance information in a running process. If determining that the target network in which the network performance assurance information is configured does not meet the network performance assurance information in the running process, the processing unit 102 performs exception processing.

Specifically, the processing unit 102 performs exception processing in the following manners: adjusting the network, so that an adjusted network meets the network performance assurance information, or sending a network performance assurance exception notification to the second management device.

The adjusting the network includes at least one of the following operations: modifying a topology structure of the network; adjusting a transport network between network components in the network; replacing a network component in the network with a new network component; upgrading a network component in the network; and configuring a network component in the network. The configuring a network component in the network may include: when the network component in the network is a base station or a wireless network including a base station, configuring an antenna of the base station, configuring an optimization policy (including a handover policy and the like) of the base station, adding a resource, or the like.

In another possible embodiment, the network performance assurance apparatus applied to the first management device further includes a sending unit 103. The sending unit 103 is configured to: before the receiving unit 101 receives the target network management request sent by the second management device, send at least one piece of network performance assurance capability information supported by the target network to the second management device, where the at least one piece of network performance assurance capability information supported by the target network includes the network performance assurance information.

The receiving unit 101 is further configured to: before the sending unit 103 sends the network performance assurance capability information supported by the target network to the second management device, obtain a network template corresponding to the target network, where the network template includes the at least one piece of network performance assurance capability information supported by the target network. The processing unit 102 determines, based on the network template, the at least one piece of network performance assurance capability information supported by the target network.

When a hardware form is used for implementation, in this embodiment of this application, the receiving unit 101 may be an input interface, the processing unit 102 may be a processor or a controller, and the sending unit 103 may be an output interface. The output interface and the input interface are collective names, and may include one or more interfaces.

Figure 7:
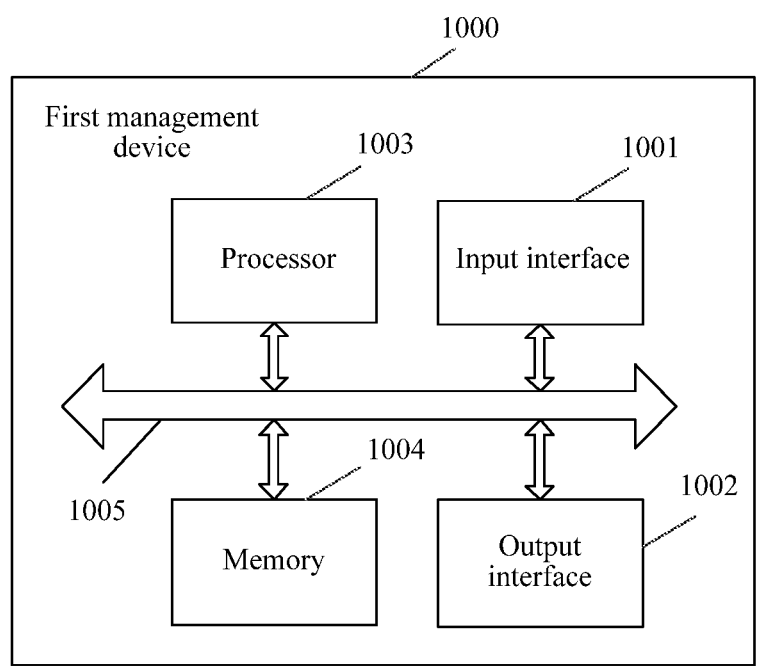
FIG. 7 is another schematic structural diagram of a network performance assurance apparatus applied to a first management device according to an embodiment of this application.

When the receiving unit 101 is an input interface, the processing unit 102 is a processor, and the sending unit 103 is an output interface, the network performance assurance apparatus 100 in this embodiment of this application may be a first management device shown in FIG. 7.

FIG. 7 is a schematic diagram of a first management device 1000 according to an embodiment of this application. In other words, it can be understood that FIG. 7 is another schematic structural diagram of a network performance assurance apparatus applied to a first management device. The first management device 1000 may be configured to perform the method performed by the first management device in FIG. 2 or FIG. 5. As shown in FIG. 7, the first management device 1000 includes an input interface 1001, an output interface 1002, a processor 1003, and a memory 1004. The input interface 1001, the output interface 1002, the processor 1003, and the memory 1004 may be connected to each other by using a bus system 1005.

The memory 1004 is configured to store a program, an instruction, or code. The processor 1003 is configured to execute the program in the memory 1004, to control the input interface 1001 to receive a target network management request, and to control the output interface 1002 to send network performance assurance capability information supported by a target network and implement steps and functions implemented by the first management device in the foregoing implementations. Details are not described herein again. For specific implementations of the input interface 1001, the output interface 1002, and the processor 1003, refer to specific descriptions of the receiving unit 101, the processing unit 102, and the sending unit 103 in the foregoing implementations in FIG. 6 correspondingly. Details are not described herein again.

Based on a same concept as the foregoing method embodiment, an embodiment of this application further provides another network performance assurance apparatus.

Figure 8:
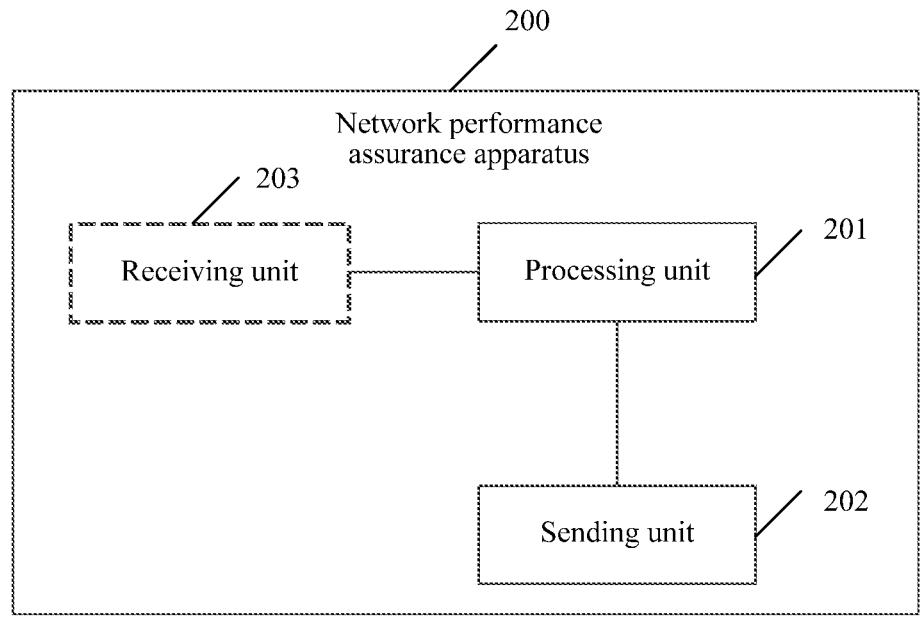
FIG. 8 is a schematic structural diagram of a network performance assurance apparatus applied to a second management device according to an embodiment of this application.

When an integrated unit is used, FIG. 8 is a schematic diagram of a possible logical structure of a network performance assurance apparatus. The network performance assurance apparatus may be applied to a second management device. As shown in FIG. 8, a network performance assurance apparatus 200 includes a processing unit 201 and a sending unit 202. The processing unit 201 is configured to determine network performance assurance information of a target network, where the network performance assurance information includes at least one of a network performance assurance granularity and a network performance assurance condition, the network performance assurance granularity is used to describe a network performance assurance object of the target network, and the network performance assurance condition is used to describe a probability that a network performance assurance object meets network performance. The sending unit 202 is configured to send a target network management request to a first management device, where the target network management request includes the network performance assurance information of the target network determined by the processing unit 201.

The target network management request further includes an applicable condition corresponding to the network performance assurance information.

Specifically, the network performance assurance object includes at least one of a terminal, a cell, a region, a terminal group, and a tenant. The probability that a network performance assurance object meets network performance includes at least one of the following proportions: a proportion of network performance assurance objects that meet the network performance in all network performance assurance objects, and a proportion of a usage time in which service performance is met in a service usage process of the network performance assurance object in a total time. Optionally, the network performance assurance condition may be alternatively used to describe a probability that a network performance assurance object does not meet network performance, for example, a proportion of network performance assurance objects that do not meet the network performance in all network performance assurance objects, or a proportion of a usage time in which service performance is not met in a service usage process of the network performance assurance object in a total time.

In a possible implementation, the network performance assurance apparatus applied to the second management device further includes a receiving unit 203. The receiving unit 203 is configured to: before the processing unit 201 determines the network performance assurance information of the target network, receive at least one piece of network performance assurance capability information supported by the target network that is sent by the first management device, where the at least one piece of network performance assurance capability information supported by the target network includes the network performance assurance information.

Specifically, the processing unit 201 determines the network performance assurance information of the target network in the following manner: determining the network performance assurance information based on the at least one piece of network performance assurance capability information supported by the target network.

In a possible implementation, the network performance assurance apparatus applied to the second management device further includes the receiving unit 203. The receiving unit 203 is configured to receive a service request, where the service request includes service performance assurance information, the service performance assurance information includes at least one of a service performance assurance granularity and a service performance assurance condition, the service performance assurance granularity is used to describe a service performance assurance object of the target network, and the service performance assurance condition is used to describe a probability that a service performance assurance object meets service performance. The processing unit 201 determines the network performance assurance information of the target network based on the service performance assurance information.

When a hardware form is used for implementation, in this embodiment of this application, the receiving unit 203 may be an input interface, the processing unit 201 may be a processor or a controller, and the sending unit 202 may be an output interface. The output interface and the input interface are collective names, and may include one or more interfaces.

Figure 9:
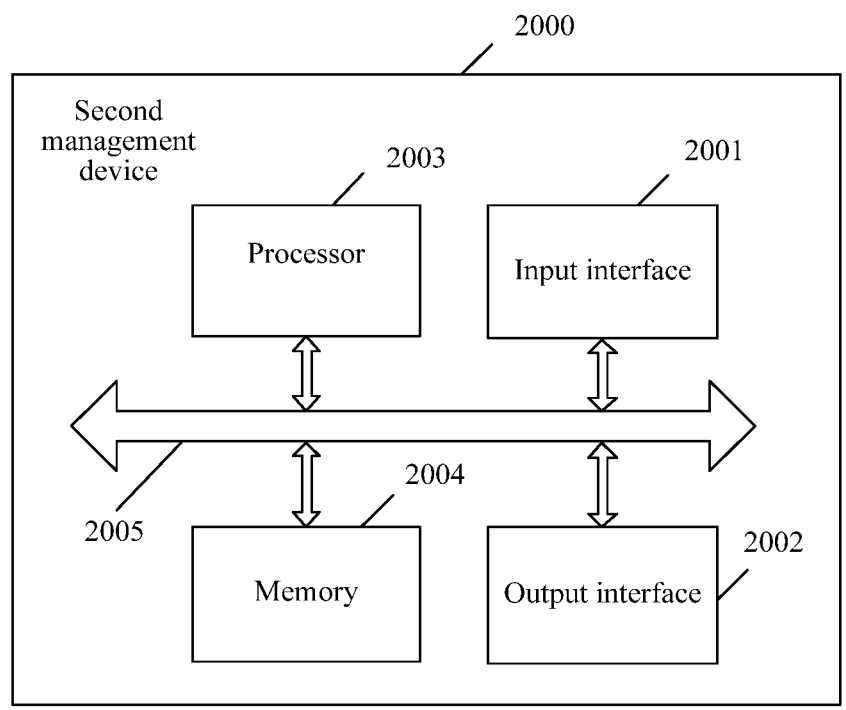
FIG. 9 is another schematic structural diagram of a network performance assurance apparatus applied to a second management device according to an embodiment of this application.

When the receiving unit 203 is an input interface, the processing unit 201 is a processor, and the sending unit 202 is an output interface, the network performance assurance apparatus 200 in this embodiment of this application may be a second management device shown in FIG. 9.

FIG. 9 is a schematic diagram of a second management device 2000 according to an embodiment of this application. In other words, it can be understood that FIG. 9 is another schematic structural diagram of a network performance assurance apparatus applied to a second management device. The second management device 2000 may be configured to perform the method performed by the second management device in FIG. 2 or FIG. 5. As shown in FIG. 9, the second management device 2000 includes an input interface 2001, an output interface 2002, a processor 2003, and a memory 2004. The input interface 2001, the output interface 2002, the processor 2003, and the memory 2004 may be connected to each other by using a bus system 2005.

The memory 2004 is configured to store a program, an instruction, or code. The processor 2003 is configured to execute the program in the memory 2004, to control the input interface 2001 to receive network performance assurance capability information supported by a target network, and to control the output interface 2002 to send a target network management request and implement steps and functions implemented by the second management device in the foregoing implementations. Details are not described herein again. For specific implementations of the input interface 2001, the output interface 2002, and the processor 2003, refer to specific descriptions of the processing unit 201, the sending unit 202, and the receiving unit 203 in the foregoing implementations in FIG. 8 correspondingly. Details are not described herein again.

It can be understood that FIG. 7 and FIG. 9 show merely simplified designs of the first management device and the second management device. During actual application, the first management device and the second management device are not limited to the foregoing structures. During actual application, the first management device and the second management device each may include any quantity of interfaces, processors, memories, and the like, and all terminals that can implement the embodiments of this application shall fall within the protection scope of the embodiments of this application.

It can be further understood that the network performance assurance apparatus 100, the first management device 1000, the network performance assurance apparatus 200, and the second management device 2000 in the embodiments of this application may be configured to implement the corresponding functions of the first management device and the second management device in the foregoing method embodiments in the embodiments of this application. Therefore, for a part that is not described in detail in the embodiments of this application, refer to related descriptions in the method embodiments. Details are not described in the embodiments of this application again.

It should be further understood that, in the embodiments of this application, the processor may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory may include a read-only memory and a random access memory, and provide the processor with an instruction and data. A part of the memory may further include a nonvolatile random access memory. For example, the memory may further store information of a device type.

In addition to a data bus, the bus system may further include a power bus, a control bus, a status signal bus, and the like. However, for clear description, various buses in the figures are marked as the bus system.

In an implementation process, the steps in the foregoing method embodiments can be implemented by using an integrated logic circuit of hardware in the processor, or by using an instruction in a form of software. The steps of the network performance assurance methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information from the memory and completes the steps in the foregoing methods in combination with hardware of the processor. To avoid repetition, details are not described herein again.

An embodiment of this application provides a communications system. The communications system includes the foregoing network performance assurance apparatus applied to the first management device and the foregoing network performance assurance apparatus applied to the second management device.

An embodiment of this application provides a computer readable storage medium. The computer readable storage medium stores a computer instruction, and when the instruction is run on a computer, any method performed by the first management device or the second management device in the foregoing embodiments can be completed.

An embodiment of this application provides a computer program product. The computer program product includes a computer program, and the computer program is used to perform any method performed by the first management device or the second management device in the foregoing embodiments.

An embodiment of this application further provides a chip. The chip is coupled to a transceiver in a first management device or a second management device, and is configured to perform the technical solution in any possible design provided in the first aspect of the embodiments of this application. It should be understood that "coupling" in the embodiments of this application means that two components are directly or indirectly combined with each other. Such a combination may be fixed or mobile, and the combination may allow fluid, electricity, electrical signals, or other types of signals to communicate between the two components.

According to the network performance assurance method and apparatus provided in the embodiments of this application, the network performance assurance information includes the at least one of the network performance assurance granularity and the network performance assurance condition. Therefore, it may not be necessary to assure performance of terminals in the entire network provided that the network performance of the target network meets the network performance assurance granularity and/or the network performance assurance condition included in the network performance assurance information. This can lower a network device performance requirement, increase a network performance evaluation pass rate, and reduce an exception processing probability.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A network performance assurance method, comprising:
   receiving, by a first management device, a target network management request from a second management device, wherein the target network management request comprises network performance assurance information of a target network, wherein the network performance assurance information comprises at least one of a network performance assurance granularity or a network performance assurance condition, wherein the network performance assurance granularity includes at least one of terminal, cell, region, terminal group, or tenant; and
   managing, by the first management device, the target network based on the network performance assurance information;
   wherein the network performance assurance condition describes at least one of the following:
   a proportion of terminals for which a network performance requirement is met;
   a proportion of usage time during which a service performance requirement is met out of a total time for a service usage process;
   a proportion of terminals for which a network performance requirement is not met; or
   a proportion of usage time during which a service performance requirement is not met out of a total time for a service usage process.

2. The method according to claim 1, wherein managing the target network based on the network performance assurance information comprises:
   selecting, by the first management device, a network that meets the network performance assurance information to serve as the target network.

3. The method according to claim 1, wherein managing the target network based on the network performance assurance information comprises:
   creating, by the first management device, a network that meets the network performance assurance information to serve as the target network.

4. The method according to claim 1, wherein managing the target network based on the network performance assurance information comprises:
   configuring, by the first management device, the network performance assurance information in the target network or in management information of the target network.

5. The method according to claim 1, further comprising:
   adjusting, by the first management device, the target network to meet the network performance assurance information, wherein adjusting the target network comprises at least one of the following operations:
   modifying a topology structure of the target network;
   adjusting a transport network between network components in the target network;
   replacing a network component in the target network with a new network component;
   upgrading a network component in the target network; or
   configuring a network component in the target network.

6. The method according to claim 1, further comprising:
   determining, by the second management device, the network performance assurance information of the target network; and
   sending, by the second management device, the target network management request to the first management device.

7. A network performance assurance apparatus comprising:
   a processor; and
   a memory coupled to the processor and having processor-executable instructions stored thereon;
   wherein the processor-executable instructions, when executed by the processor, facilitate performance of the following by the network performance assurance apparatus:
   receiving a target network management request from a second management device, wherein the target network management request comprises network performance assurance information of a target network, wherein the network performance assurance information comprises at least one of a network performance assurance granularity or a network performance assurance condition, wherein the network performance assurance granularity includes at least one of terminal, cell, region, terminal group, or tenant; and
   managing the target network based on the network performance assurance information comprised in the target network management request;
   wherein the network performance assurance condition describes at least one of the following:
   a proportion of terminals for which a network performance requirement is met;

a proportion of usage time during which a service performance requirement is met out of a total time for a service usage process;
a proportion of terminals for which a network performance requirement is not met; or
a proportion of usage time during which a service performance requirement is not met out of a total time for a service usage process.

8. The apparatus according to claim 7, wherein the processor-executable instructions, when executed by the processor, further facilitate performance of the following by the network performance assurance apparatus:
selecting a network that meets the network performance assurance information to serve as the target network.

9. The apparatus according to claim 7, wherein the processor-executable instructions, when executed by the processor, further facilitate performance of the following by the network performance assurance apparatus:
creating a network that meets the network performance assurance information to serve as the target network.

10. The apparatus according to claim 7, wherein the processor-executable instructions, when executed by the processor, further facilitate performance of the following by the network performance assurance apparatus:
configuring the network performance assurance information in the target network or in management information of the target network.

11. The apparatus according to claim 7, wherein the processor-executable instructions, when executed by the processor, further facilitate performance of the following by the network performance assurance apparatus:
adjusting, the target network to meet the network Performance assurance information, wherein adjusting the target network comprises at least one of the following operations:
modifying a topology structure of the target network;
adjusting a transport network between network components in the target network;
replacing a network component in the target network with a new network component;
upgrading a network component in the target network; or
configuring a network component in the target network.

12. A system for assuring network performance, comprising:
a first management device; and
a second management device;
wherein the second management device is configured to:
determine network performance assurance information of a target network, wherein the network performance assurance information comprises at least one of a network performance assurance granularity or a network performance assurance condition, wherein the network performance assurance granularity includes at least one of terminal, cell, region, terminal group, or tenant; and
send a target network management request to the first management device, wherein the target network management request comprises the network performance assurance information of the target network; and
wherein the first management device is configured to:
receive the target network management request; and
manage the target network based on the network performance assurance information;
wherein the network performance assurance condition describes at least one of the following:
a proportion of terminals for which a network performance requirement is met;
a proportion of usage time during which a service performance requirement is met out of a total time for a service usage process;
a proportion of terminals for which a network performance requirement is not met; or
a proportion of usage time during which a service performance requirement is not met out of a total time for a service usage process.

13. The system according to claim 12, wherein the first management device is configured to:
select a network that meets the network performance assurance information to serve as the target network.

14. The system according to claim 12, wherein the first management device is configured to:
create a network that meets the network performance assurance information to serve as the target network.

15. The system according to claim 12, wherein the first management device is configured to:
configure the network performance assurance information in the target network or in management information of the target network.

16. The system according to claim 13, wherein the first management device is further configured to:
perform exception processing based on the first management device determining that the target network does not meet the network performance assurance information in a running process.

17. A network performance assurance apparatus, comprising:
a processor; and
a memory coupled to the processor and having processor-executable instructions stored thereon;
wherein the processor-executable instructions, when executed by the processor, facilitate performance of the following by the network performance assurance apparatus:
determining network performance assurance information of a target network, wherein the network performance assurance information comprises at least one of a network performance assurance granularity or a network performance assurance condition, wherein the network performance assurance granularity includes at least one of terminal, cell, region, terminal group, or tenant; and
sending a target network management request to a first management device, wherein the target network management request comprises the network performance assurance information of the target network;
wherein the network performance assurance condition describes at least one of the following:
a proportion of terminals for which a network performance requirement is met;
a proportion of usage time during which a service performance requirement is met out of a total time for a service usage process;
a proportion of terminals for which a network performance requirement is not met; or
a proportion of usage time during which a service performance requirement is not met out of a total time for a service usage process.

18. The apparatus according to claim 17, wherein the target network management request further comprises an applicable condition corresponding to the network performance assurance information.

19. A network performance assurance method, comprising:
- determining, by a second management device, network performance assurance information of a target network, wherein the network performance assurance information comprises at least one of a network performance assurance granularity or a network performance assurance condition, wherein the network performance assurance granularity includes at least one of terminal, cell, region, terminal group, or tenant; and
- sending, by the second management device, a target network management request to a first management device, wherein the target network management request comprises the network performance assurance information of the target network;
- wherein the network performance assurance condition describes at least one of the following:
- a proportion of terminals for which a network performance requirement is met;
- a proportion of usage time during which a service performance requirement is met out of a total time for a service usage process;
- a proportion of terminals for which a network performance requirement is not met; or
- a proportion of usage time during which a service performance requirement is not met out of a total time for a service usage process.

20. The method according to claim 19, wherein the target network management request further comprises an applicable condition corresponding to the network performance assurance information.

* * * * *

UNITED STATES PATENT AND TRADEMARK OFFICE
CERTIFICATE OF CORRECTION

PATENT NO. : 11,489,737 B2
APPLICATION NO. : 17/337865
DATED : November 1, 2022
INVENTOR(S) : Xu et al.

It is certified that error appears in the above-identified patent and that said Letters Patent is hereby corrected as shown below:

In the Claims

Claim 7: Column 34, Lines 42 and 43: "A network performance assurance apparatus comprising:"
Should read -- A network performance assurance apparatus, comprising: --.

Claim 11: Column 35, Lines 32 and 33: "adjusting, the target network to meet the network Performance assurance information, wherein adjusting the"
Should read -- adjusting the target network to meet the network performance assurance information, wherein adjusting the --.

Signed and Sealed this
Eleventh Day of April, 2023

Katherine Kelly Vidal
*Director of the United States Patent and Trademark Office*